March 25, 1941.  O. C. HELGESON  2,236,032
AUTOMATIC FUEL CONTROL FOR INTERNAL COMBUSTION ENGINES
Filed April 13, 1939  2 Sheets-Sheet 1
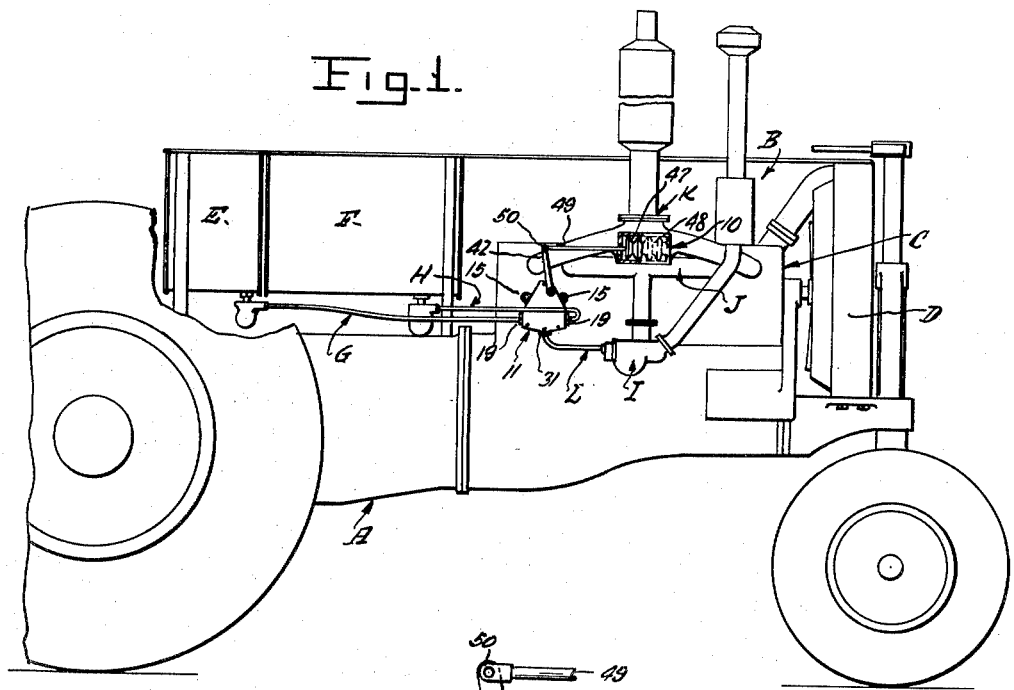
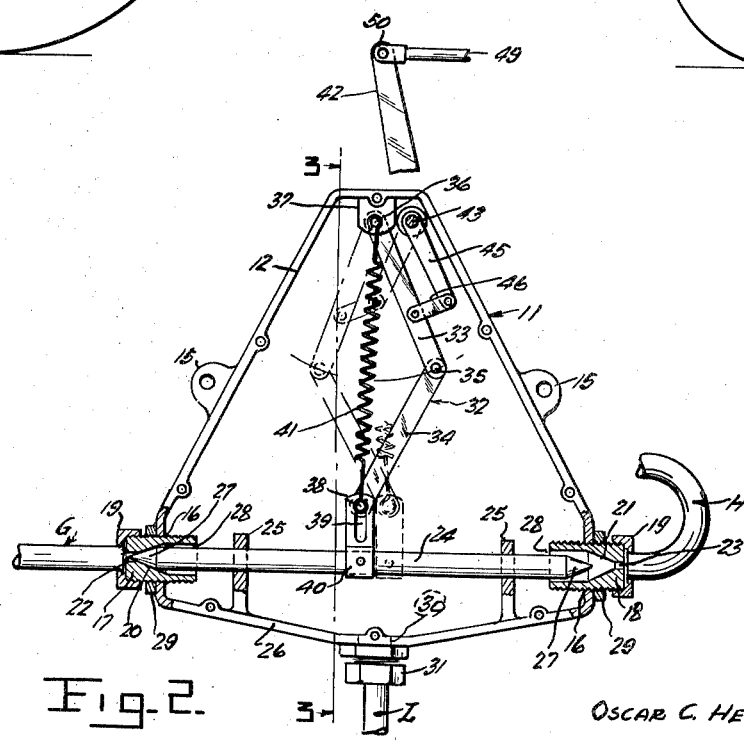
Inventor
OSCAR C. HELGESON
By Carlsen & Hayle
Attorneys

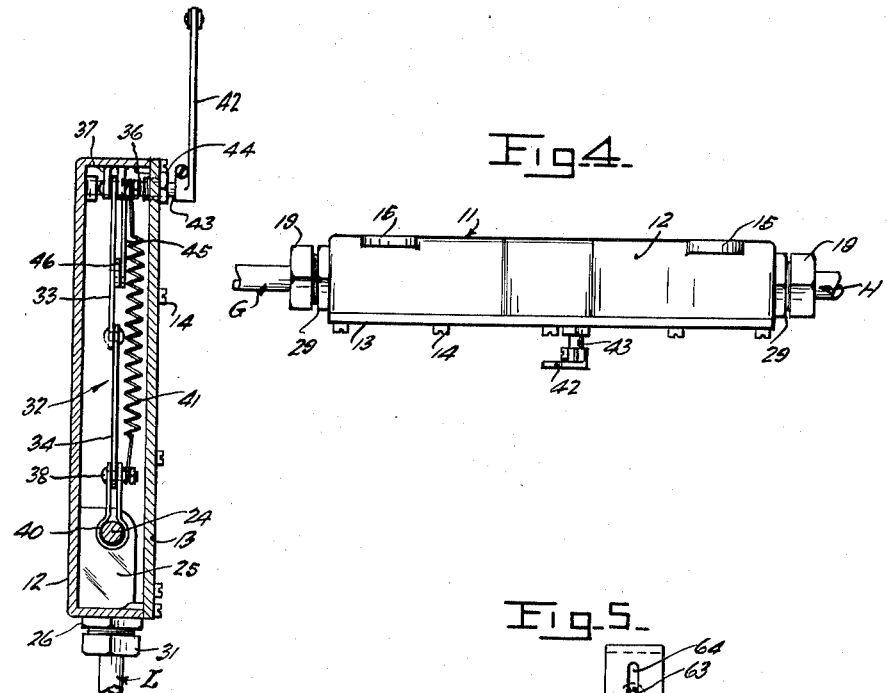
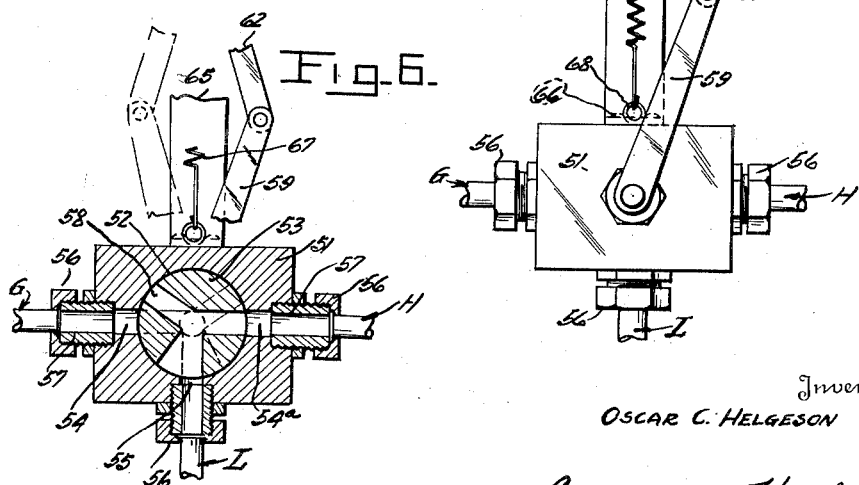

Patented Mar. 25, 1941

2,236,032

UNITED STATES PATENT OFFICE 2,236,032

AUTOMATIC FUEL CONTROL FOR INTERNAL COMBUSTION ENGINES

Oscar C. Helgeson, Dawson, Minn., assignor of one-half to Louis P. Sandbakken, Dawson, Minn.

Application April 13, 1939, Serial No. 267,635

4 Claims. (Cl. 74—100)

My invention relates to improvements in fuel control means for internal combustion engines.

In some engines, particularly those used as power plants and upon tractors, provision is made for use of both gasoline and some cruder fuel such as kerosene, distillate, or the like. The gasoline is used when starting the engine, due to its better qualities of combustion, and it is necessary to operate the engine on this fuel long enough for combustion chamber and other parts to become thoroughly heated before the cruder fuel is used, this heat aiding greatly in the proper vaporization, combustion, and ignition of the fuel. Hitherto the fuel control, or the changeover between fuels, has been accomplished by hand, and it frequently happens either that the engine is not allowed to warm up sufficiently before the change is made, resulting in stalling or other bad effects or, to the other extreme, the engine is run much longer than necessary before the change is made, thus causing an unnecessary use of the relatively expensive gasoline.

Inasmuch as the heat of the engine is the essential factor governing the proper time for making the fuel change, my invention, as its main object, intends to provide a simple and effective automatic means for making the fuel change in accordance with, and under control of, variations in the heat of the engine. Another object is to provide means of this kind embodying a simple and novel form of valve mechanism for controlling the passage of either gasoline or cruder fuel to the engine, and which valve is actuated by a thermostat or thermomotive device located in, or in contact with, some part of the engine which assumes a high temperature as the engine warms up in operation. A further object is to provide a fuel control mechanism of this kind which may be readily applied to the engine and connected with working parts thereof, as required.

These and other more detailed and specific objects will be disclosed in the course of the following specification, reference being had to the accompanying drawings, in which—

Fig. 1 is a fragmentary side elevation of a conventional type of tractor and engine showing my fuel control means installed thereon.

Fig. 2 is an enlarged side elevation of the valve unit, the cover being removed and some parts shown in section.

Fig. 3 is a vertical cross section along the line 3—3 in Fig. 2.

Fig. 4 is a top plan view of the valve.

Fig. 5 is a side elevation of a rotary type of valve and modified assembly of the parts directly actuating the same.

Fig. 6 is a vertical section through the lower portion of the valve of Fig. 5, showing interior parts of the valve per se.

Referring now more particularly and by reference numerals to the drawings, A designates a tractor of conventional form upon which a power unit B of the internal combustion type is mounted. This showing is for purposes of exemplification only, and it is of course understood that my invention may be used as well upon a stationary power unit if so desired.

The power unit or engine, as it will be hereinafter termed, embodies the usual cylinder and crankcase assembly C connected for cooling purposes to a radiator D and fuel is carried in tanks E and F which are connected by lines G and H to the carburetor I. One tank, as E, carries gasoline while the other and larger one F carries distillate or other cruder fuel, and ordinarily selection as to which tank is connected to the carburetor is made by some kind of manually actuated valve, not shown in the drawings. The carburetor I is connected to the engine by intake manifold J and the exhaust is through the exhaust manifold K.

In the ordinary operation of such assemblies the engine, as stated, is started first on gasoline and allowed to heat up thoroughly before the switch to distillate is made, this operation being carried out by hand and of course introducing the human factor into the operation with frequent interruption and other bad effects upon the operation, as well as at the cost of taking the operator's attention away from other duties. Inasmuch as the exhaust manifold K invariably reaches a high temperature as the engine warms up, I have provided a thermostatically operating or thermomotive actuating means 10 which is located in said manifold, or in direct contact therewith, and which is connected to a fuel control valve unit 11 in such manner that this valve will automatically control the fuel admission in response to variations in the operating temperature of the engine.

The valve unit 11 will be first described and, in its embodiment shown in Figs. 1–4, it comprises a housing 12 having a removable side or cover plate 13 which may be secured in place by screws 14 to form a liquid tight chamber within said housing. Ears 15 are provided on the housing by means of which the housing may be attached in convenient position upon the engine B as clearly shown.

Near its lower corners the housing 12 has tapped openings 16 in which are screwed the valves or valve plugs 17 and 18 and the outer ends of these plugs are connected by couplings 19 to the fuel lines G and H so that gasoline will be led to valve 17 and distillate to valve 18. These valves have the tapered needle valve seats 20 and 21 located in opposed axially aligned relation and which are extended as small bores 22—23 to the lines G and H so that the fuel carried thereby may enter the interior of the housing 12. An elongated needle valve plunger or valve member 24 is slidably supported in apertured bearings 25 extended upwardly from the bottom 26 of the housing and at its ends 27 is tapered to needle point at an angle complementary to that of the valve seats 20 and 21. The length of the valve plunger is such that it may be reciprocated endwise to bring either of its pointed ends into sealing contact with the valve seats 20 or 21, but leaving the other end always clear of its adjacent seat. Either valve 17 or 18 may thus be closed as the other is opened by this relatively slight movement of the valve plunger, and the diameter of the latter is of course such that fuel may flow inwardly from the opened valve around the end of the valve plunger through the space generally designated at 28. Lock nuts 29 secure the valve plugs in place in the openings 16 and of course the plugs may be screwed inwardly or outwardly to vary the spacing between valves and the range of movement of the plunger 24 necessary to open and close the opposite valves.

A fuel outlet opening 30 is formed in the housing bottom 26 and a feed line L is coupled thereto by the coupling 31 and led off to the carburetor.

By proper manipulation of the valve unit, involving the endwise shifting movement of plunger 24, it will be quite evident that either valve 17 or 18 may be opened and either gasoline from line G or distillate from line H may be led through the housing 17 to the line L leading to the carburetor I. The valve unit may be made of very small size so that the quantity of fuel in the housing will be so minute that it will have no bad effect upon the operation of the engine as the types of fuel are varied.

For actuating the valve, and to produce the required range of movement of the plunger 24 thereof with the least possible required movement of the actuating unit 10, I provide the lever or snap-action mechanism 32. This mechanism comprises two links or arms 33 and 34 pivotally connected at their ends 35 and with the uppermost one pivoted at 36 between ears 37 at the upper end of the housing. The lower arm 34 carries a pin 38 at its lower end which is engaged with a vertically elongated slot 39 formed in a yoke or connecting member 40 secured to the plunger 24. A retractile coil spring 41 is attached at its opposite ends to the pivot 36 and the pin 38, and serves to normally draw this pin to the upper end of the slot 39 in which position, the length of the arms 33 and 34 being properly selected, these arms will be partially folded or collapsed as shown and the center 35 will be offset with respect to the generally vertical plane of the points 36 and 38. Thus by swinging the upper arms 33 toward the opposite side the toggle-like assembly will straighten out, putting greater tension upon the spring 41 and, as the center 35 moves past the aforesaid vertical plane passing through points 36 and 38, the spring will "snap" the arms to slightly folded positions at the other side. This action, due to the vertical play of the pin 38 in slot 39, will result in shifting the plunger 24 in a direction opposite to that at which the arms move and the plunger will thus act to open and close the valves 17 and 18. The greater part of the movement, however, is due to action of the spring 41, as will be readily evident, and this spring acts furthermore to normally urge the valve plunger to seated position at one valve or the other.

It will be noted that the housing 12 tapers upwardly to reduce its volumetric content, but this taper is such that adequate space will be left for the aforesaid movement of the mechanism 32.

An operating lever 42 is supported exteriorly of the housing 12 upon a shaft 43 which is journaled through a bearing and packing gland 44 into the housing. Interiorly of the housing a lever 45 is secured to this shaft 43, and is pivotally connected at its end by a link 46 to upper arm 33 so that the mechanism 32 may be actuated under exterior control by said lever 42.

The actuating unit 10 includes a thermostat element 47 which is enclosed in a housing 48 secured to the exhaust manifold K (or within the manifold itself) and which has a slidably extended operating rod 49. The thermostat element has the property of expanding with an accordion-like action when heated, and thus reciprocating the rod 49. The rod is extended and pivotally connected at 50 to the operating lever 42.

The foregoing construction is such that in the "cold" condition of the motor the thermostat element will contract and by its connection with the lever 42 adjust the valve unit 11 to the position at which the gasoline line G is connected to the carburetor I and the distillate supply is shut off. Then as the engine is started and warms up, the thermostat as it expands will swing the lever 42 to move the valve plunger 24 to a position at which gasoline is shut off and distillate connected to the carburetor, thus automatically effecting the change of fuel. The reverse takes place as the engine cools after being stopped. The usual valves (not shown) beneath the tanks E and F may be used if it is desired to shut off both gasoline and distillate at the same time.

The unit 10 might also be arranged in the radiator or other parts of the cooling circuit since the cooling water also becomes heated as the engine runs.

The valve unit shown in Figs. 5 and 6 is of the rotatable, three way type embodying a housing 51 having a chamber 52 in which is rotatably seated a valve member or rotor 53. Ports 54 and 54a connect the gasoline and fuel lines G and H to opposite sides of the chamber 52 while another port 55 connects the feed line L to the chamber at a point midway between these ports. Couplings 56 and plugs 57 serve to connect these lines as shown. The rotor 53 has a T-shaped passage 58 which is so arranged that in one position line G will be connected to feed line L and in another position, assumed by a relatively short range of movement of the rotor, the line H will be connected to line L. In each case the line not connected will be closed off.

An operating arm 59 is secured to the rotor 53 and forms the lower element of the toggle-like operating mechanism 60. The upper end of this arm is pivoted at 61 to an upper arm 62 which is provided at its upper end with a pin 63 engaged in the vertically elongated slot 64 of a bracket or frame 65 which is secured at 66 to the housing 51. A retractile coil spring 67 is stretched between this pin 63 and a fastening means 68 atop the housing and the rod 49 leading from the actuating unit 10 is pivoted directly at 69 to the upper arm 62.

In operation the hereinbefore described action of the thermostat rod 49 will cause the arm 62 to be swung from side to side, causing a corresponding movement of the arm 59 and rotation of the valve rotor 53 to connect one or the other of the lines G and H to the carburetor under control of the heat of the engine. The length of the slot 64 determines the range of movement to cause proper registry of the passage 58 with the ports 54, 54a, and 55, and the spring 67 will hold the parts in adjusted positions.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. An actuating mechanism for a reciprocating valve, comprising a pair of arms pivotally connected at meeting ends, means pivotally connecting one end of one arm to the valve, means pivotally supporting the opposite end of the other arm and holding the same against movement in a direction away from the valve, said connecting means having a slot permitting endwise movement of the connected arm in a direction toward or away from the said supporting means for the other arm, a retractile coil spring stretched between opposite end portions of the arms, and means for swinging the arms to adjust the valve.

2. An actuating mechanism for a reciprocating valve, comprising a pair of arms pivotally connected at meeting ends for relative swinging movements in a plane parallel with the direction of movement of the valve, means pivotally supporting the end of one arm in a position remote from the valve and at fixed spacing relative thereto, a connecting member on the valve and having a slot extended at right angles to the direction of movement of the valve, the other arm adjacent the valve having a pin slidably and pivotally engaging the said slot, a retractile coil spring stretched between the said pivotal supporting means and the pin, and means for swinging the arms for adjusting the valve.

3. Mechanism for actuating a reciprocating valve member, comprising a pair of arms pivotally connected at one end for relative swinging movements in a plane parallel with the direction of reciprocation of the valve member, a connecting member on the valve member and having a slot extending substantially at right angles to the said direction of reciprocation, one of said arms having a pin pivotally and slidably mounted in the slot, means pivotally supporting the end of the other arm at fixed spacing relative to the valve member, a retractile coil spring connected between the said pivotal supporting means and the pin to normally move the pin outward in the said slot away from the valve member and partially fold the arms to relative angular positions, an operating shaft journaled adjacent one arm, an operating lever on the shaft and swingable about the axis thereof in the same directions as the arm, and a link connecting the operating lever to the arm at a point between the pivoted ends of the arm.

4. Actuating mechanism for a valve having a housing and a reciprocating member in a lower end portion of the housing, the said mechanism comprising a pair of pivotally connected arms arranged within the housing, means pivotally supporting the upper arm at the upper portion of the housing for swinging movements in a plane parallel with the direction of reciprocation of the valve member, means connecting the lower arm to the valve member to reciprocate said member in response to swinging movement of the upper arm, an operating lever mounted in the housing alongside the upper arm and connected for swinging the arm, the said housing having opposite walls tapered in an upward direction to reduce the volumetric capacity of the housing while providing a downwardly flaring and widened clearance space within the housing for swinging the said arm and for the said operating lever.

OSCAR C. HELGESON.